(12) United States Patent
Suvitie

(10) Patent No.: US 12,228,938 B2
(45) Date of Patent: Feb. 18, 2025

(54) FAILSAFE BEHAVIOR CONFIGURATION FOR AUTONOMOUS NAVIGATION

(71) Applicant: Nokia Technologies Oy, Espoo (FI)

(72) Inventor: Arto Kristian Suvitie, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 208 days.

(21) Appl. No.: 17/936,901

(22) Filed: Sep. 30, 2022

(65) Prior Publication Data

US 2023/0100224 A1   Mar. 30, 2023

(30) Foreign Application Priority Data

Sep. 30, 2021   (EP) .................................... 21200172

(51) Int. Cl.
G05D 1/00   (2024.01)

(52) U.S. Cl.
CPC ......... *G05D 1/0225* (2013.01); *G05D 1/0214* (2013.01)

(58) Field of Classification Search
CPC .. G05D 1/0225; G05D 1/0214; G05D 1/0282; B60W 60/0018; B60W 2556/45; G01C 21/20
See application file for complete search history.

(56) References Cited

U.S. PATENT DOCUMENTS 10,372,124 B2    8/2019 Shi et al.
2018/0114450 A1  4/2018 Glaab et al.
(Continued)

FOREIGN PATENT DOCUMENTS

EP    1462898 A2    9/2004
EP    1752849 A1    2/2007
(Continued)

OTHER PUBLICATIONS

DJI Guides, "Return to Home (RTH): Must-have Drone Feature", Retrieved via the Internet on Apr. 27, 2023, <URL:https://store.dji.com/guides/return-to-home-rth-must-have-drone-feature/>, (May 31, 2019), 4 pages.
(Continued)

*Primary Examiner* — Russell Frejd
*Assistant Examiner* — Ana D Thomas
(74) *Attorney, Agent, or Firm* — ALSTON & BIRD LLP

(57) ABSTRACT

Method, apparatuses, and computer program products provide for configuration of failsafe behavior for autonomous navigation. In particular, an active failsafe home is repeatedly established from a plurality of failsafe homes, and an autonomous vehicle is configured to travel to the active failsafe home when a communication fault occurs. An example method includes determining a location of the autonomous vehicle and determining whether a particular failsafe home of a plurality of failsafe homes associated with the autonomous vehicle satisfies a pre-determined visibility condition with respect to the location of the autonomous vehicle and one or more constraint areas. The method further includes, in accordance with a determination that the particular failsafe home satisfies the pre-determined visibility condition, establishing the particular failsafe home as an active failsafe home for the autonomous vehicle. The method further includes causing transmission of an indication of the active failsafe home to the autonomous vehicle.

16 Claims, 6 Drawing Sheets

(56) References Cited

U.S. PATENT DOCUMENTS

| | | |
|---|---|---|
| 2018/0229842 A1 | 8/2018 | Stabler et al. |
| 2018/0232250 A1 | 8/2018 | Stephens |
| 2019/0009904 A1 | 1/2019 | Winkle et al. |
| 2019/0103032 A1 | 4/2019 | Sasaki |
| 2019/0108680 A1 | 4/2019 | Querejeta et al. |
| 2019/0265705 A1 | 8/2019 | Zhang et al. |
| 2019/0300172 A1 | 10/2019 | Di Benedetto et al. |
| 2020/0175882 A1* | 6/2020 | Singh .................. G05D 1/0055 |
| 2020/0393852 A1 | 12/2020 | Rozenberg et al. |
| 2021/0012666 A1 | 1/2021 | Schmidt |

FOREIGN PATENT DOCUMENTS

| | | |
|---|---|---|
| EP | 3518068 A1 | 7/2019 |
| WO | WO 2016/172251 A1 | 10/2016 |
| WO | WO 2018/178759 A1 | 10/2018 |
| WO | WO 2019/025919 A1 | 2/2019 |

OTHER PUBLICATIONS

Extended European Search Report for European Application No. 21200172.1 dated Mar. 30, 2022, 10 pages.

Mujumdar et al., "CAPER: A Connectivity-Aware Path Planner with Regulatory Compliance for UAVs", 2019 15th International Conference on Distributed Computing in Sensor Systems (DCOSS), (Aug. 19, 2019), 8 pages.

San et al., "A Real-time Flight Safety Alarm System for Multiple UAVs", MATEC Web of Conferences 291, The 3rd International Conference on Mechanical, System and Control Engineering (ICMSC 2019), (Aug. 28, 2019), 5 pages.

Wang et al., "Formation Reconstruction and Trajectory Replanning for Multi-UAV Patrol", IEEE/ASME Transactions on Mechatronics, vol. 26, Issue 2, (Feb. 2, 2021), 11 pages.

* cited by examiner

FAILSAFE BEHAVIOR CONFIGURATION FOR AUTONOMOUS NAVIGATION

CROSS-REFERENCE TO RELATED APPLICATIONS

This application claims priority to European Patent Application No. 21200172.1, filed Sep. 30, 2021, the entire contents of which are incorporated herein by reference.

TECHNOLOGICAL FIELD

An example embodiment relates generally to autonomous vehicle navigation, pathfinding, path planning, and/or the like. More particularly, an example embodiment includes techniques for navigation of an autonomous vehicle while respecting constraint areas present in an environment.

BACKGROUND

In performing various tasks, an autonomous vehicle navigates within an environment that may include one or more constraint areas, or areas within which the autonomous vehicle is prevented, precluded, barred, and/or the like from being positioned. Navigation of the autonomous vehicle must be configured and defined such that the autonomous vehicle respects the constraint areas, in any situation regardless of whether the autonomous vehicle is in communication with a navigation control station or whether communication with the navigation control station has faulted.

BRIEF SUMMARY

Certain autonomous vehicles are configured to navigate directly to an active failsafe home upon determining that a communication fault has occurred, and specifically that connectivity with an associated navigation control station or system has been lost. The navigation of an autonomous vehicle to the active failsafe home is typically and approximately along a straight line; however, in some instances, constraint areas may be positioned between the autonomous vehicle and the active failsafe home. In such instances, pathfinding cannot be applied due at least in part to loss of connectivity with the navigation control station or system which provides the pathfinding, and the autonomous vehicle is not configured with native pathfinding capabilities, for example to conserve native processing and computing resources. Accordingly, various embodiments of the present disclosure provide for station-side control of an autonomous vehicle to anticipate failsafe behavior (e.g., navigating approximately along a straight line to an active failsafe home) with respect to various constraint areas. Specifically, various embodiments provide for dynamic selection and establishment of different failsafe homes as the active failsafe home based at least in part on repeated and frequent location determinations for the autonomous vehicle.

Thus, various embodiments of the present disclosure provide methods, systems, computer program products, apparatuses, devices, and/or the like for failsafe behavior configuration through dynamic selection and establishment of an active failsafe home as an autonomous vehicle navigates around an environment with constraint areas. An active failsafe home is selected and established such that, in the event of a communication fault, the autonomous vehicle can promptly or immediately travel from a current location to the active failsafe home in a straight-line fashion without intersecting with a constraint area.

In various embodiments, the autonomous vehicle is associated with a plurality of failsafe homes, some of which may be explicitly defined by a user or an operator at the navigation control station. Failsafe homes are evaluated to determine whether a failsafe home satisfies a pre-determined visibility condition (e.g., a straight-line visibility condition), and the failsafe home is established as the active failsafe home if it does satisfy the pre-determined visibility condition. In various example instances, multiple failsafe homes may satisfy the pre-determined visibility condition, and a particular failsafe home is established based at least in part on respective priority values associated with the failsafe homes. In various example instances, no failsafe home satisfies the pre-determined visibility condition. In such instances, various embodiments involve determining waypoints for prompt and immediate return of the autonomous vehicle to a last-established active failsafe home and transmission of the waypoints to the autonomous vehicle.

According to one aspect of the present disclosure, an apparatus is provided that includes means for determining a location of an autonomous vehicle and means for determining whether a particular failsafe home of a plurality of failsafe homes associated with the autonomous vehicle satisfies a pre-determined condition with respect to the location of the autonomous vehicle and one or more constraint areas. The apparatus further includes means for, in accordance with a determination that the particular failsafe home satisfies the pre-determined condition, establishing the particular failsafe home as an active failsafe home for the autonomous vehicle. The particular failsafe home is configured to remain as the active failsafe home until the autonomous vehicle leaves a visibility zone associated with the particular failsafe home to another visibility zone and the particular failsafe home no longer satisfies the pre-determined condition with respect to the determined location of the autonomous vehicle. The autonomous vehicle is configured to travel to the active failsafe home responsive to a communication fault. The apparatus further includes means for causing transmission of an indication of the active failsafe home to the autonomous vehicle.

In various embodiments, the particular failsafe home is established as the active failsafe home based at least in part on a respective priority value associated with the particular failsafe home in an instance in which one or more different failsafe homes are determined to satisfy the pre-determined condition. In various embodiments, the apparatus further includes means for determining a second location of the autonomous vehicle, means for, in accordance with a determination that none of the plurality of failsafe homes satisfy the pre-determined condition with respect to the second location of the autonomous vehicle and the one or more constraint areas, determining one or more waypoints for a route from the second location of the autonomous vehicle to the active failsafe home, the route satisfying the one or more constraint areas, and means for causing transmission of the one or more waypoints to the autonomous vehicle. In various embodiments, the plurality of waypoints are determined using one or more pathfinding techniques configured to optimize distances between the plurality of waypoints while satisfying the one or more constraint areas.

In various embodiments, the means for determining whether a particular failsafe home satisfies a pre-determined condition with respect to the location of the autonomous vehicle and the one or more constraint areas include means for determining a visibility zone for the particular failsafe home respecting the one or more constraint areas and associating the visibility zone with the particular failsafe home, and means for determining that the particular failsafe home satisfies the pre-determined condition based at least in part on the location of the autonomous vehicle being within the visibility zone associated with the particular failsafe home.

In various embodiments, the location is a predicted location of the autonomous vehicle based at least in part on a real-time location of the autonomous vehicle, a velocity of the autonomous vehicle, and a configurable prediction time window. In various embodiments, the apparatus includes means for determining whether the plurality of failsafe homes satisfy the straight-line visibility condition and updating the active failsafe home at a pre-determined frequency. In various embodiments, the pre-determined condition is a straight-line visibility condition.

According to another aspect of the present disclosure, another apparatus is provided that includes at least one processor and at least one memory including computer program code. The at least one memory and the computer program code are configured to, with the at least one processor, cause the apparatus to determine a location of an autonomous vehicle and to determine whether a particular failsafe home of a plurality of failsafe homes associated with the autonomous vehicle satisfies a pre-determined condition with respect to the location of the autonomous vehicle and one or more constraint areas. The at least one memory and the computer program code are further configured to, with the at least one processor, cause the apparatus to, in accordance with a determination that the particular failsafe home satisfies the pre-determined condition, establish the particular failsafe home as an active failsafe home for the autonomous vehicle. The particular failsafe home is configured to remain as the active failsafe home until the autonomous vehicle leaves a visibility zone associated with the particular failsafe home to another visibility zone and the particular failsafe home no longer satisfies the pre-determined condition with respect to the determined location of the autonomous vehicle. The autonomous vehicle is configured to travel to the active failsafe home responsive to a communication fault. The at least one memory and the computer program code are further configured to, with the at least one processor, cause the apparatus to cause transmission of an indication of the active failsafe home to the autonomous vehicle.

In various embodiments, the particular failsafe home is established as the active failsafe home based at least in part on a respective priority value associated with the particular failsafe home in an instance in which one or more different failsafe homes are determined to satisfy the pre-determined condition. In various embodiments, the at least one memory and the computer program code are further configured to, with the at least one processor, cause the apparatus to determine a second location of the autonomous vehicle. The at least one memory and the computer program code are further configured to, with the at least one processor, cause the apparatus to, in accordance with a determination that none of the plurality of failsafe homes satisfy the pre-determined condition with respect to the second location of the autonomous vehicle and the one or more constraint areas, determine one or more waypoints for a route from the second location of the autonomous vehicle to the active failsafe home. The route satisfies the one or more constraint areas. The at least one memory and the computer program code are further configured to, with the at least one processor, cause the apparatus to cause transmission of the one or more waypoints to the autonomous vehicle. In various embodiments, the plurality of waypoints are determined using one or more pathfinding techniques configured to optimize distances between the plurality of waypoints while satisfying the one or more constraint areas.

In various embodiments, determining whether a particular failsafe home satisfies a pre-determined condition with respect to the location of the autonomous vehicle and the one or more constraint areas includes determining a visibility zone for the particular failsafe home respecting the one or more constraint areas, associating the visibility zone with the particular failsafe home, and determining that the particular failsafe home satisfies the pre-determined condition based at least in part on the location of the autonomous vehicle being within the visibility zone associated with the particular failsafe home.

In various embodiments, the location is a predicted location of the autonomous vehicle based at least in part on a real-time location of the autonomous vehicle, a velocity of the autonomous vehicle, and a configurable prediction time window. In various embodiments, the at least one memory and the computer program code are further configured to, with the at least one processor, cause the apparatus to determine whether the plurality of failsafe homes satisfy the straight-line visibility condition and update the active failsafe home at a pre-determined frequency. In various embodiments, the pre-determined condition is a straight-line visibility condition.

According to another aspect of the present disclosure, a method is provided that includes determining a location of an autonomous vehicle and determining whether a particular failsafe home of a plurality of failsafe homes associated with the autonomous vehicle satisfies a pre-determined condition with respect to the location of the autonomous vehicle and one or more constraint areas. The method further includes, in accordance with a determination that the particular failsafe home satisfies the pre-determined condition, establishing the particular failsafe home as an active failsafe home for the autonomous vehicle. The particular failsafe home is configured to remain as the active failsafe home until the autonomous vehicle leaves a visibility zone associated with the particular failsafe home to another visibility zone and the particular failsafe home no longer satisfies the pre-determined condition with respect to the determined location of the autonomous vehicle. The autonomous vehicle is configured to travel to the active failsafe home responsive to a communication fault. The method further includes causing transmission of an indication of the active failsafe home to the autonomous vehicle.

In various embodiments, the particular failsafe home is established as the active failsafe home based at least in part on a respective priority value associated with the particular failsafe home in an instance in which one or more different failsafe homes are determined to satisfy the pre-determined condition. In various embodiments, the method further includes receiving a second location of the autonomous vehicle. The method further includes, in accordance with a determination that none of the plurality of failsafe homes satisfy the pre-determined condition with respect to the second location of the autonomous vehicle and the one or more constraint areas, determining one or more waypoints for a route from the second location of the autonomous vehicle to the active failsafe home. The route satisfies the one or more constraint areas. The method further includes causing transmission of the one or more waypoints to the autonomous vehicle. In various embodiments, the plurality of waypoints are determined using one or more pathfinding techniques configured to optimize distances between the plurality of waypoints while satisfying the one or more constraint areas.

In various embodiments, determining whether a particular failsafe home satisfies a pre-determined condition with respect to the location of the autonomous vehicle and the one or more constraint areas includes determining a visibility zone for the particular failsafe home respecting the one or more constraint areas, associating the visibility zone with the particular failsafe home, and determining that the particular failsafe home satisfies the pre-determined condition based at least in part on the location of the autonomous vehicle being within the visibility zone associated with the particular failsafe home.

In various embodiments, the location is a predicted location of the autonomous vehicle based at least in part on a real-time location of the autonomous vehicle, a velocity of the autonomous vehicle, and a configurable prediction time window. In various embodiments, the method further includes determining whether the plurality of failsafe homes satisfy the straight-line visibility condition and updating the active failsafe home at a pre-determined frequency. In various embodiments, the pre-determined condition is a straight-line visibility condition.

According to yet another aspect of the present disclosure, a computer program product is provided that includes a non-transitory computer readable storage medium having program code portions stored thereon, with the program code portions being configured, upon execution, to determine a location of an autonomous vehicle and to determine whether a particular failsafe home of a plurality of failsafe homes associated with the autonomous vehicle satisfies a pre-determined condition with respect to the location of the autonomous vehicle and one or more constraint areas. The program code portions are further configured, upon execution, to establish, in accordance with a determination that the particular failsafe home satisfies the pre-determined condition, the particular failsafe home as an active failsafe home for the autonomous vehicle. The particular failsafe home is configured to remain as the active failsafe home until the autonomous vehicle leaves a visibility zone associated with the particular failsafe home to another visibility zone and the particular failsafe home no longer satisfies the pre-determined condition with respect to the determined location of the autonomous vehicle. The autonomous vehicle is configured to travel to the active failsafe home responsive to a communication fault. The program code portions are further configured, upon execution, to cause transmission of an indication of the active failsafe home to the autonomous vehicle.

In various embodiments, the particular failsafe home is established as the active failsafe home based at least in part on a respective priority value associated with the particular failsafe home in an instance in which one or more different failsafe homes are determined to satisfy the pre-determined condition. In various embodiments, the program code portions are further configured, upon execution, to receive a second location of the autonomous vehicle. The program code portions are further configured, upon execution, to determine, in accordance with a determination that none of the plurality of failsafe homes satisfy the pre-determined condition with respect to the second location of the autonomous vehicle and the one or more constraint areas, one or more waypoints for a route from the second location of the autonomous vehicle to the active failsafe home. The route satisfies the one or more constraint areas. The program code portions are further configured, upon execution, to cause transmission of the one or more waypoints to the autonomous vehicle. In various embodiments, the plurality of waypoints are determined using one or more pathfinding techniques configured to optimize distances between the plurality of waypoints while satisfying the one or more constraint areas.

In various embodiments, determining whether a particular failsafe home satisfies a pre-determined condition with respect to the location of the autonomous vehicle and the one or more constraint areas includes determining a visibility zone for the particular failsafe home respecting the one or more constraint areas, associating the visibility zone with the particular failsafe home, and determining that the particular failsafe home satisfies the pre-determined condition based at least in part on the location of the autonomous vehicle being within the visibility zone associated with the particular failsafe home.

In various embodiments, the location is a predicted location of the autonomous vehicle based at least in part on a real-time location of the autonomous vehicle, a velocity of the autonomous vehicle, and a configurable prediction time window. In various embodiments, the program code portions are further configured, upon execution, to determine whether the plurality of failsafe homes satisfy the straight-line visibility condition and to update the active failsafe home at a pre-determined frequency. In various embodiments, the pre-determined condition is a straight-line visibility condition.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
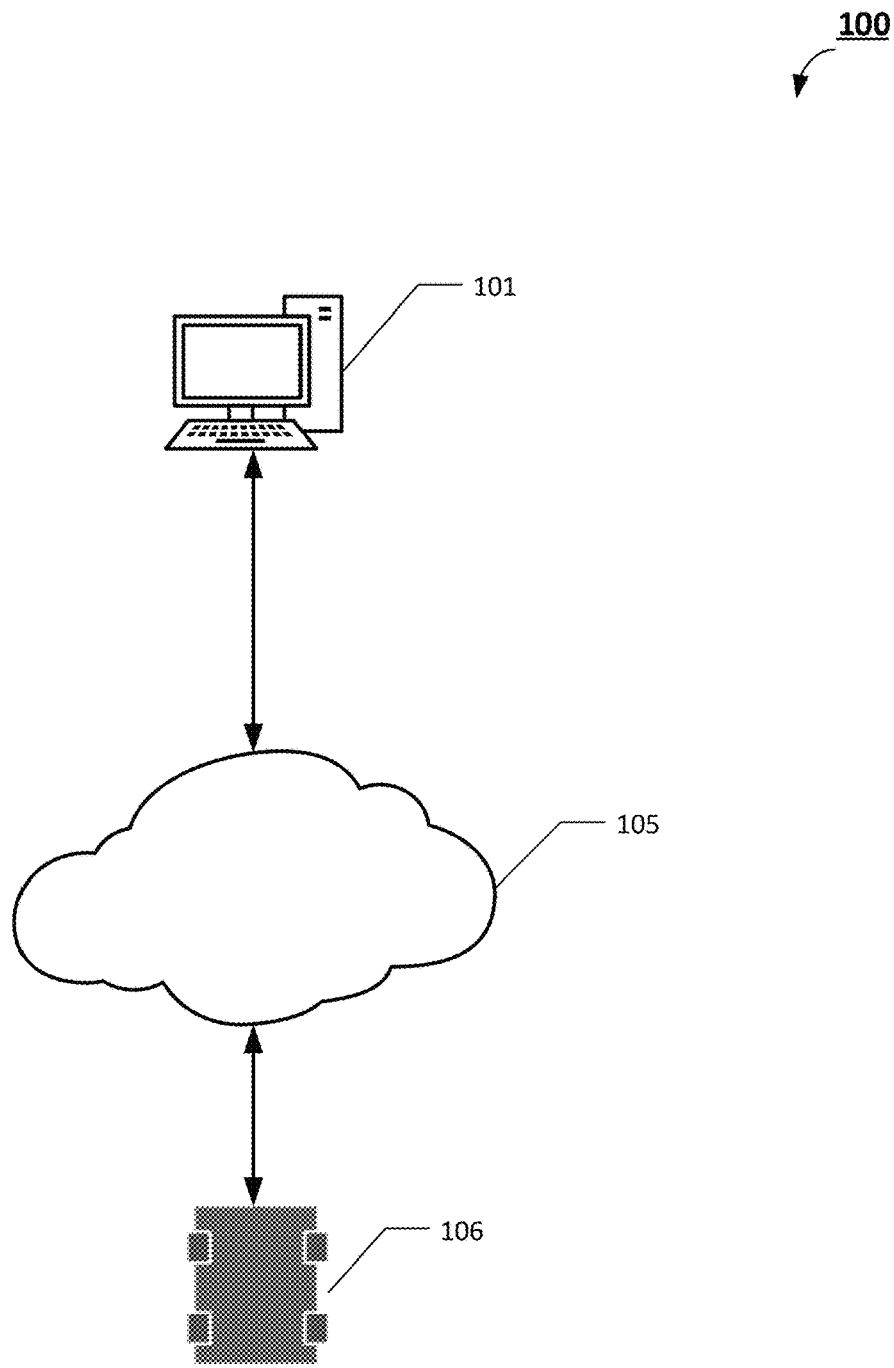

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

Figure 2:
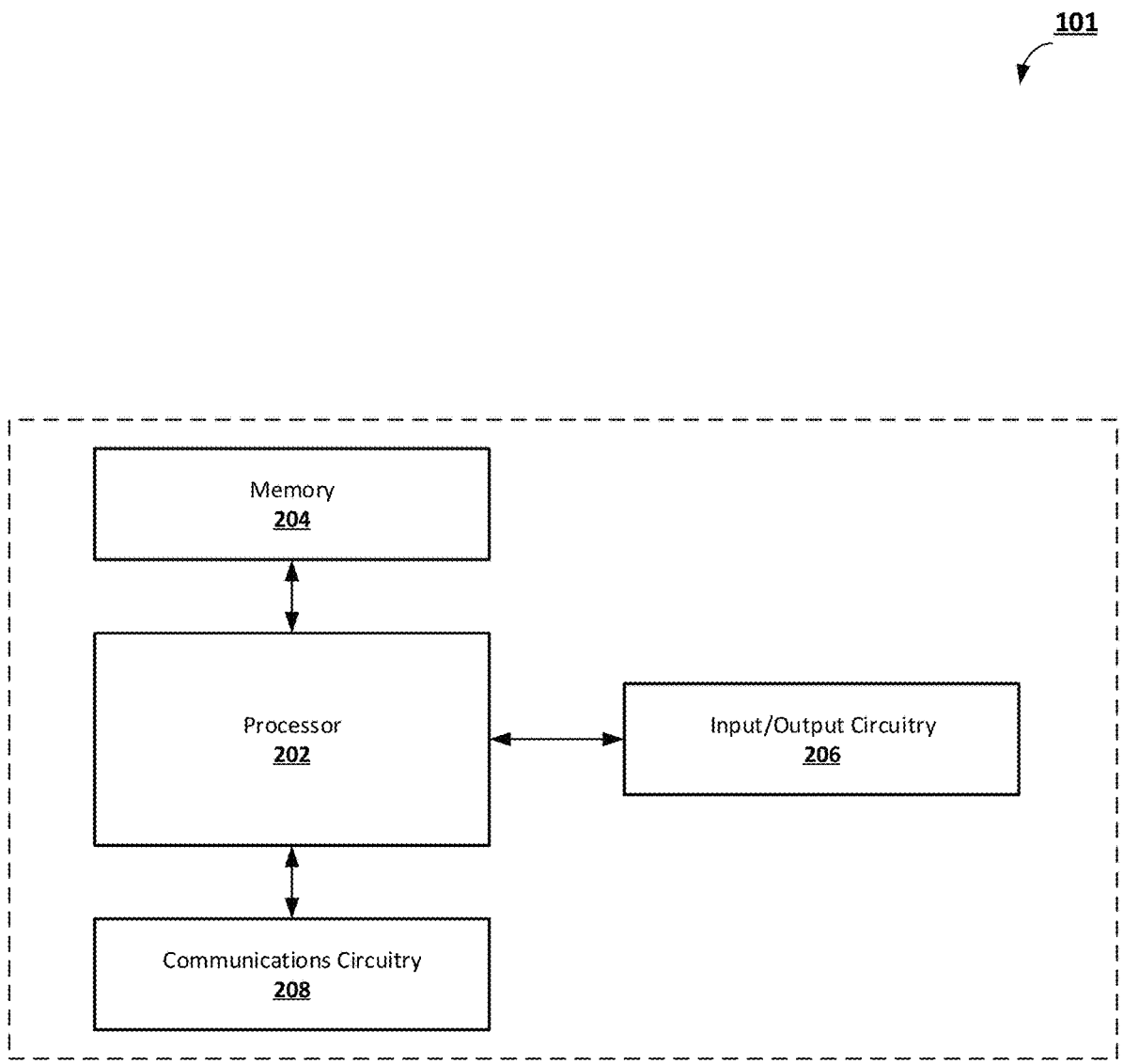
Figure 3A:
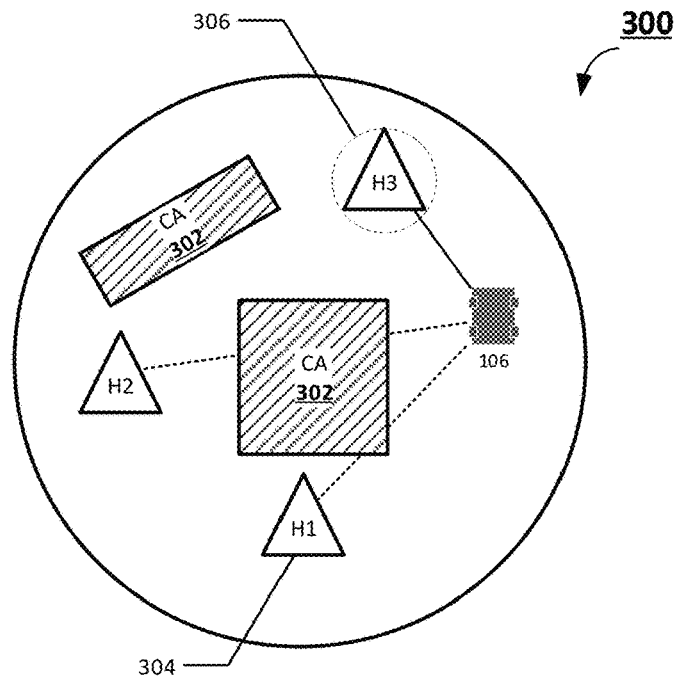
Figure 3B:
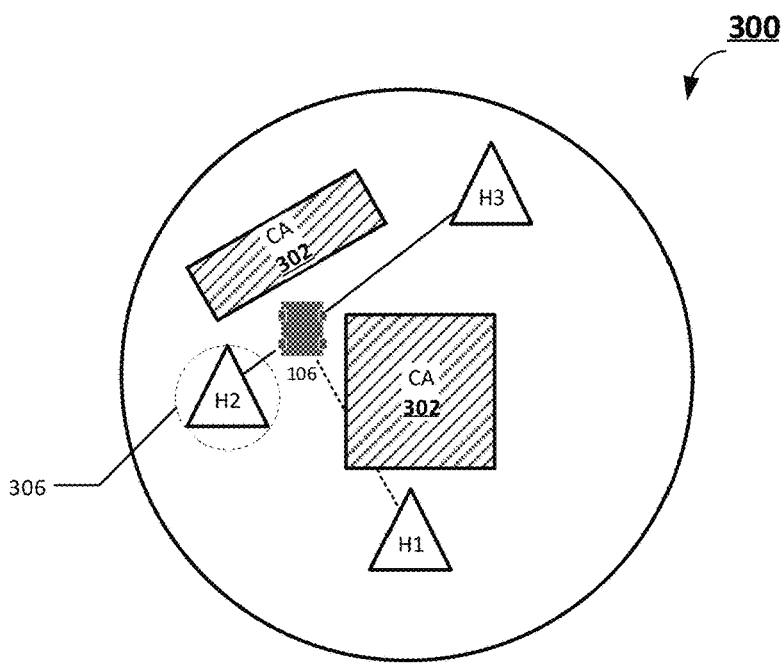
Figure 4A:
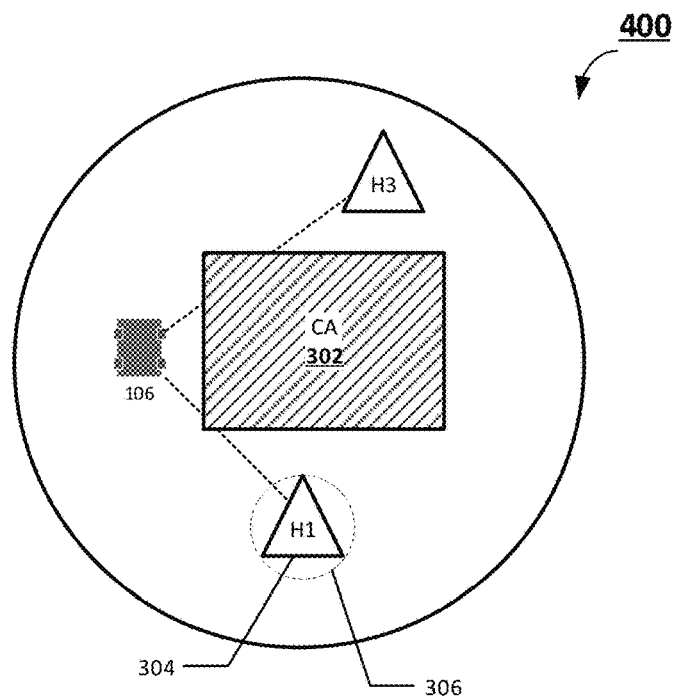
Figure 4B:
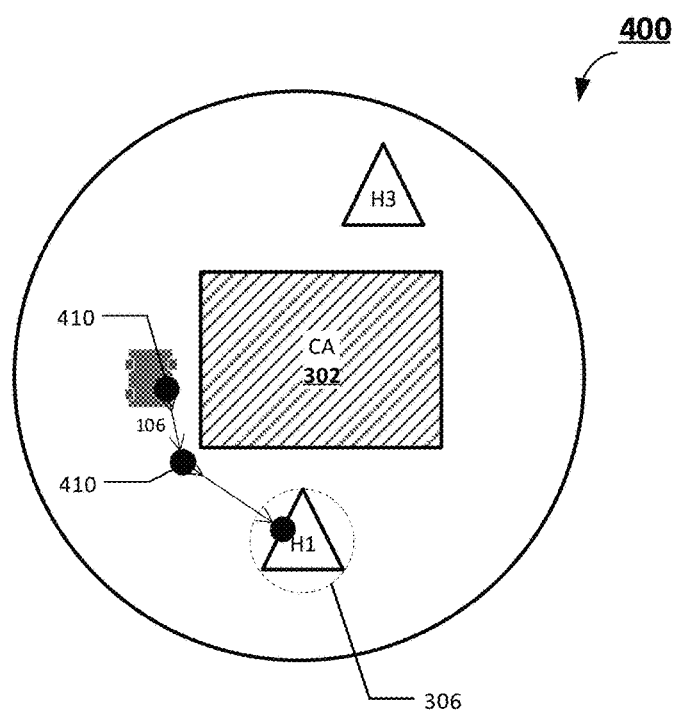
Figure 5A:
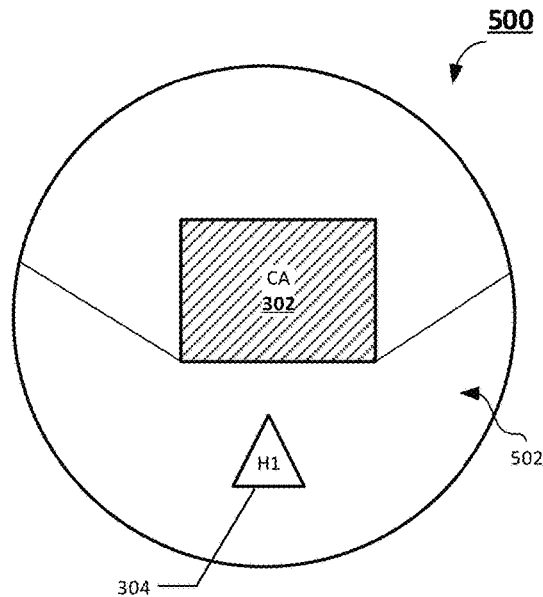
Figure 5B:
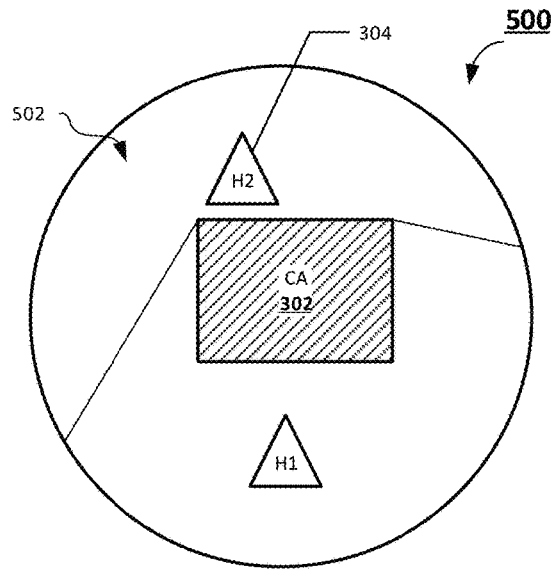
Figure 5C:
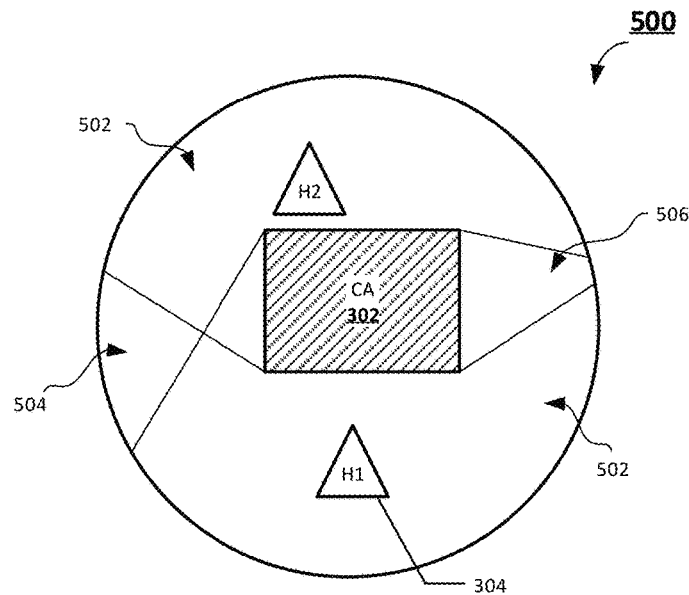
Figure 6:
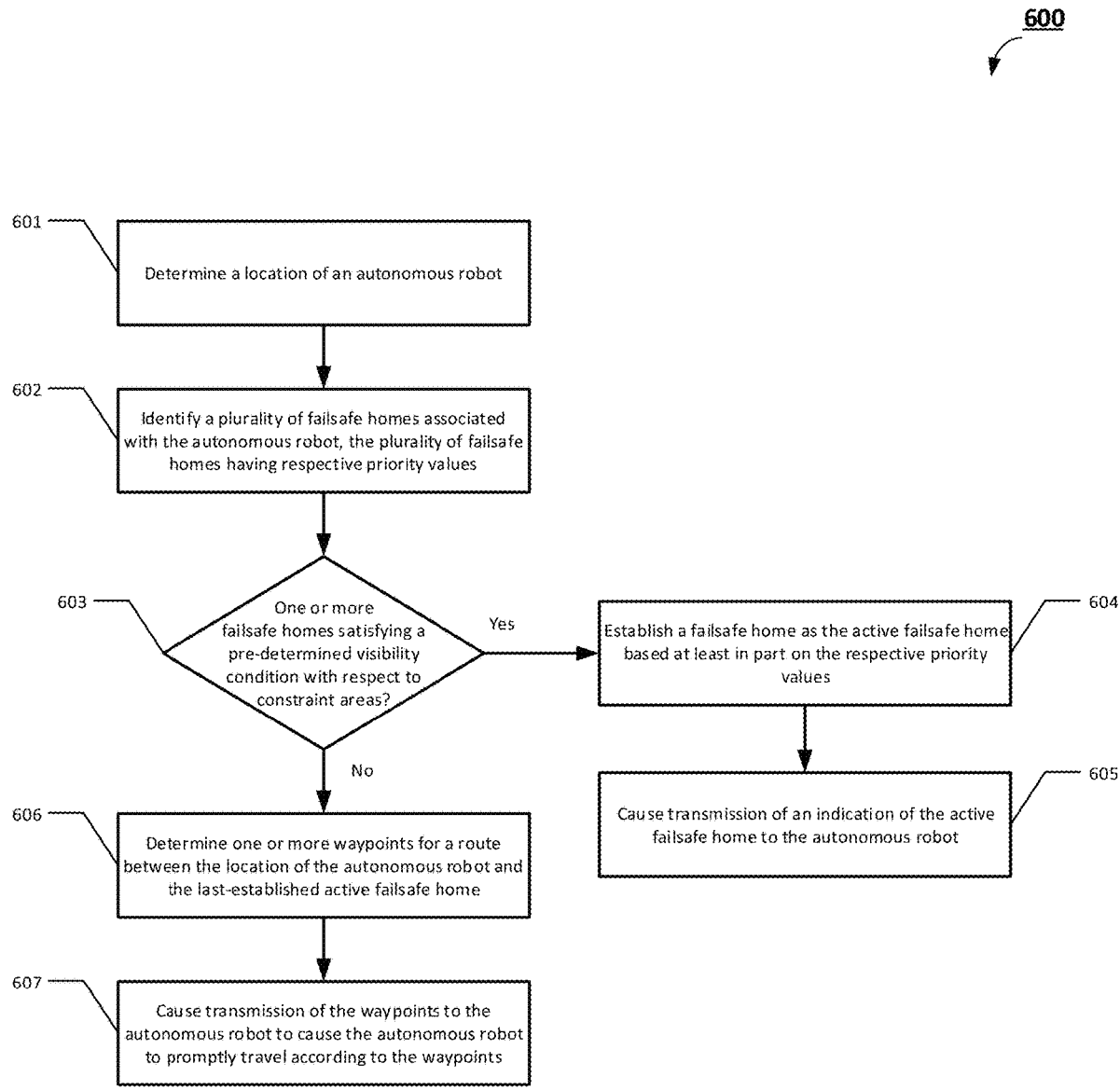

FIG. 1 is a diagram of an example system architecture for configuring failsafe behavior for autonomous navigation and dynamically selecting and establishing an active failsafe home for an autonomous vehicle, in accordance with various embodiments;

FIG. 2 is a block diagram of an example apparatus configured for configuration of failsafe behavior based at least in part on dynamically selecting and establishing an active failsafe home for an autonomous vehicle, in accordance with various embodiments;

FIGS. 3A-B illustrate example selection and establishment of an active failsafe home with example failsafe homes, in accordance with various embodiments;

FIGS. 4A-B illustrate an example configuration of failsafe behavior in an instance in which no active failsafe home can be established, in accordance with various embodiments;

FIGS. 5A-C illustrate an example configuration of failsafe behavior based at least in part on determining visibility zones for failsafe homes and associating a visibility zone with a corresponding failsafe home, in accordance with various embodiments; and FIG. 6 provides a flowchart describing example operations performed for configuration of failsafe behavior based at least in part on dynamically selecting and establishing an active failsafe home for an autonomous vehicle, in accordance with various embodiments.

DETAILED DESCRIPTION

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The phrases "in one embodiment," "according to one embodiment," "in some embodiments," "in various embodiments", and the like generally refer to the fact that the particular feature, structure, or characteristic following the phrase may be included in the at least one embodiment of the present disclosure, but not necessarily all embodiments of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Navigation for an autonomous vehicle may be handled by a navigation control station in communication with the autonomous vehicle. That is, the navigation control station (e.g., or a system or an apparatus thereof) performs various pathfinding techniques to determine waypoints for the autonomous vehicles to travel to and, in some instances, to perform some task. For example, the navigation control station is a ground control station. In some examples, the functionalities or parts of the functionalities of the navigation control station may be implemented by the autonomous vehicle itself via an application, for example. In various other examples, the functionalities or parts of the functionalities of the navigation control station may be implemented by another autonomous vehicle; that is, the navigation control station may be embodied by a leader autonomous vehicle configured to handle navigation for another autonomous vehicle. In many exemplary autonomous vehicles, it is preferable for navigation to be accordingly handled by a navigation control station (e.g., a ground control station, a leader autonomous vehicle) in order to minimize navigational processing and computing by the autonomous vehicle locally, natively, on-board, and/or similar terms used interchangeably herein. As communication with the navigation control station is relatively important to the functionality (e.g., navigational or otherwise) of the autonomous vehicle, exemplary autonomous vehicles are configured to directly return to a home location, or specifically an active failsafe home, whenever communication with the navigation control station or a navigation control system itself has faulted or is lost.

In this regard, various embodiments provide for dynamic selection and establishment of an active failsafe home for an autonomous vehicle. In particular, various embodiments involve establishment of a particular failsafe home as the active failsafe home according to and while respecting various constraint areas positioned near, around, in the vicinity of, and/or the like the autonomous vehicle. A constraint area may be a No-Fly Zone, a large physical object or barrier, an untraversable and/or hostile region, a region owned or controlled by another party, another autonomous vehicle, and/or the like, and represents an area within which the autonomous vehicle cannot be positioned and/or an area through which the autonomous vehicle cannot traverse. Accordingly, various embodiments comprise dynamic establishment of an active failsafe home such that direct and approximately straight return of the autonomous vehicle to the active failsafe home (e.g., in the event of a communication fault) respects any constraint areas that exist.

While certain embodiments herein may refer to autonomous vehicles as real-world physical entities, it is to be appreciated that the operations discussed herein may be performed with other agents, such as digital entities in a virtual setting (e.g., video game characters and/or entities, entities within a simulation, and/or the like). Furthermore, the term "autonomous vehicles" used herein may encompass any type of robot or autonomous vehicle, such as autonomous robots, drones, and/or the like as well as the digital entities in a virtual setting. For example, the term "autonomous vehicle" may refer to a fully-autonomous vehicle, a partially-autonomous vehicle, a vehicle with some degree of autonomy, and/or the like. For example, in some embodiments, a plurality of autonomous vehicles may comprise autonomous vehicles of different types, such as autonomous robots, vehicles, drones, and/or the like, that may move along the route in various manners, such as by moving along the ground, flying, and/or the like.

Certain embodiments described herein then dynamically establish an active failsafe home from a plurality of failsafe homes associated with an autonomous vehicle. In one example embodiment, failsafe homes are evaluated and an active failsafe home is established and/or updated at a pre-determined frequency (e.g., twice per second), or intermittently. In various embodiments, configuration of failsafe behavior by dynamically establishing an active failsafe home begins with determining a location of the autonomous vehicle and then determining whether failsafe homes associated with the autonomous vehicle satisfy a pre-determined visibility condition. For example, the pre-determined visibility condition comprises a condition that an approximately straight line between the location of the autonomous vehicle and a failsafe home does not intersect with a constraint area (e.g., the failsafe home is visible to the autonomous vehicle). As another example, the pre-determined visibility condition comprises a condition that an approximately straight line between the location of the autonomous vehicle and a point elevated above the failsafe home does not intersect with a constraint area, such that the autonomous vehicle may navigate (e.g., aerially) straight to the point elevated above the failsafe home and land at the failsafe home. As yet another example, the pre-determined visibility condition comprises a condition that an approximately straight line between the location of the autonomous vehicle and any point within a spherical zone (e.g., with a pre-determined radius) centered on the failsafe home does not intersect with a constraint area. A failsafe home that satisfies the pre-determined visibility condition may then be established as the active failsafe home for the autonomous vehicle.

In some examples, the pre-determined condition may comprise the pre-determined visibility condition. In some examples, the pre-determined condition may not comprise the pre-determined visibility condition. For example, the pre-determined condition may comprise a type of the fault. The type of fault may be associated with corresponding route instructions outside a constraint area but within a visibility zone. In some examples the route instructions are configured to provide a constraint-free route to a gas station, charging station, repair place, service point, and/or the like within a visibility zone. The visibility zone and the pre-determined condition may be associated with each other. For example, when the vehicle is located in the visibility zone H1, then if the vehicle has fault regarding sensor, then the vehicle may be configured to use the constraint-free route relating to the visibility zone H1 to get the service point. In some examples the route instructions may comprise destination and/or one or more waypoints to get the gas station, charging station, repair place, service point, and/or the like. In some examples the gas station, charging station, repair place, service point, and/or the like are located in the same location with the failsafe home, or the one or more of the gas stations, charging stations, repair places, service points, and/or the like is/are different for failsafe home. In some examples a navigation control station may be configured to process the route instructions. The route instructions may be stored in the autonomous vehicle or in other suitable device to which the autonomous vehicle may have an access.

As used herein, the terms "visible" and "directly accessible" are used interchangeably herein and may be used to describe reachability or accessibility by the autonomous vehicle. In particular, a failsafe home is described as "visible" or "directly accessible" in an instance in which the autonomous vehicle can travel from its present location to the failsafe home in a direct and approximately straight line. Generally, visibility may refer to direct access to a point associated with the failsafe home, such as a point elevated above the failsafe home from which the autonomous vehicle can land at the failsafe home. Thus, visibility may be dependent on elevation of the autonomous vehicle and the failsafe home, as well as vertical movement capabilities of the autonomous vehicle such as takeoff and landing. In some example instances, an autonomous vehicle cannot travel from its present location to the failsafe home in a direct and approximately straight line due to a constraint area being positioned in the way, Thus, the failsafe home, in such example instances, may not be considered "visible" or "directly accessible" and may instead be considered "invisible", "directly inaccessible", "indirectly accessible", and/or similar terms used interchangeably herein. Visibility of a failsafe home can be determined before and/or without the autonomous vehicle actually and experimentally traveling to the failsafe home and instead can be determined, as provided by various embodiments of the present disclosure, using a location of the autonomous vehicle, a location of the failsafe home, and locations of constraint areas.

In example instances in which no failsafe homes satisfy the pre-determined visibility condition, the autonomous vehicle is caused to promptly and immediately return to the active failsafe home and is provided with pathfinding-determined waypoints that facilitate the return of the autonomous vehicle to the active failsafe home once the autonomous vehicle has again left the active failsafe home and returned to service. It may be appreciated then that if a communication fault occurred while no failsafe homes are visible to the autonomous vehicle, direct return to any failsafe home would result in violation of a constraint area, thereby necessitating the prompt and/or immediate return of the autonomous vehicle to the active failsafe home as provided with pathfinding-determined waypoints to ensure against the violation of a constraint area in the event of an occurrence of a communication fault.

An embodiment described herein provides technical advantages in extending autonomous functionality for autonomous vehicles to account for constraint areas in any scenario regardless of communication status. With various embodiments described herein, constraint areas remain respected when an autonomous vehicle does not have full control of navigation and is only capable of returning directly or in a straight-line fashion to an active failsafe home. As such, a need for any remedial actions that arise from inadvertently violating a constraint area and/or remedial resources is obviated. Further, local processing and computing resources of the autonomous vehicle are conserved, as various embodiments eliminate or at least reduce both a need to implement navigational logic to handle constraint areas to be performed by the autonomous vehicle in the event of a communication fault and a need to store data identifying and defining the constraint areas at the autonomous vehicle. Thus, for example, the autonomous vehicle may instead dedicate processing and computing resources to diagnosing, repairing, logging, and/or the like the communication fault itself.

In various embodiments, the active failsafe home is selected from a set of failsafe homes identified based at least in part on the communication fault or other fault experienced by the autonomous vehicle. For instances, a communication fault experienced due to lower power may result in the active failsafe home being selected from a set of charging stations for the autonomous vehicle. There may be one or more different types of failsafe homes to be selected depending on a fault experienced by the autonomous vehicle. Depending on a type of fault experienced by the autonomous vehicle, the particular failsafe home relating to the type of the fault is selected. For example, a failsafe home that is a gas station is selected for an autonomous vehicle experiencing a gas shortage fault. As another example, a failsafe home with sensor repair capabilities is selected for an autonomous vehicle experiencing a sensor fault. In yet another example, a failsafe home may provide or comprise a constraint-free route to a gas station, repair place, service point, and/or the like. Thus, failsafe homes may each have different capabilities, uses, properties, and/or the like and may be accordingly prioritized, selected, filtered, established as the active failsafe home, and/or the like. Multiple failsafe homes that may relate to the fault experienced by the autonomous vehicle may be further prioritized with respect to each other based at least in part on various conditions. For example, the pre-determined visibility condition may be the first condition for prioritizing the multiple failsafe homes.

Referring now to FIG. 1, an example system architecture 100 within which embodiments disclosed herein may operate is illustrated. It will be appreciated that the system architecture 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of such a system, numerous other configurations may also be employed. In some embodiments, the system architecture 100 includes a navigation control system 101 configured to dynamically establish active failsafe homes as an autonomous vehicle 106 travels around an environment. In some embodiments, the navigation control system 101 is configured to cause transmission of data, such as a data indicating an active failsafe home or data including one or more waypoints and a command to promptly navigate according to the waypoints, to the autonomous vehicle 106, via a network 105 for example. Similarly, the navigation control system 101 is configured to receive data originating from the autonomous vehicle 106 (e.g., via the network 105), such data including positional telemetry for example (e.g., location data determined by the autonomous vehicle 106, data from which the navigation control system 101 can compute a location of the autonomous vehicle 106). In various embodiments, the navigation control system 101 is configured to interact with more than one autonomous vehicle 106 at substantially the same time (e.g., in parallel) and to establish active failsafe homes for each autonomous vehicles 106.

The navigation control system 101 may communicate with the autonomous vehicle 106 and/or other external computing devices using the network 105. The network 105 may include any wired or wireless communication network including, for example, a wired or wireless local area network (LAN), personal area network (PAN), metropolitan area network (MAN), wide area network (WAN), or the like, as well as any hardware, software and/or firmware required to implement the network (such as, e.g., network routers, etc.). For example, the network 105 may include a cellular telephone, a radio access architecture based on long term evolution advanced (LTE Advanced, LTE-A), new radio (NR, 5G), without restricting the embodiments to such an architecture, however, universal mobile telecommunications system (UMTS) radio access network (UTRAN or E-UTRAN), long term evolution (LTE, the same as E-UTRA), an 802.11, 802.16, 802.20, and/or WiMax network. In various embodiments, the network 105 includes a new radio or 5G network enabling sidelink communications, in which the navigation control system 101 and the autonomous vehicle 106 may communicate with each other directly without requiring relaying of data through a radio access network. In such embodiments, the navigation control system 101 (e.g., a ground control system, a leader autonomous vehicle) and the autonomous vehicle 106 may create their own ad hoc network for communication without a radio access network acting as an intermediary. As such, communication between the navigation control system 101 and the autonomous vehicle 106 may be advantageously efficient and faster. In certain embodiment in which the navigation control system 101 is embodied by a leader autonomous vehicle, the leader autonomous vehicle may be configured to provide navigation and manage failsafe behavior (e.g., by configuring active failsafe homes) for each of a group, unit, convoy, fleet, and/or the like of autonomous vehicles 106.

Further, the network 105 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, in some examples, the networking protocol may be customized to suit the needs of the navigation control system 101.

In some embodiments, the navigation control system 101 is configured to determine a location of an autonomous vehicle 106. In some example instances, the navigation control system 101 determines a location of an autonomous vehicle 106 based at least in part on receiving a location from the autonomous vehicle 106, the autonomous vehicle 106 having positioning circuitry (e.g., GPS circuitry, cellular network) configured to determine a location of the autonomous vehicle 106. In some other example instances, the navigation control system 101 determines a location of an autonomous vehicle 106 based at least in part on receiving data from which a location can be computed. For example, the navigation control system 101 receives data including transitionary data, such as a velocity and direction of the autonomous vehicle 106, and determines a location using the transitionary data, a previously-determined location, and an elapsed time period.

In various embodiments, the navigation control system 101 is configured to access, store, receive, and/or the like a plurality of failsafe homes for an autonomous vehicle 106. For instance, the navigation control system 101 stores a file listing coordinates and/or location information of failsafe homes associated with the autonomous vehicle 106. In an example embodiment, the autonomous vehicle 106 locally stores such a file and provides at least coordinates of failsafe homes to the navigation control system 101. The failsafe homes may include a location from which the autonomous vehicle 106 began a mission or began navigation, and such a location may be added to the plurality of failsafe homes associated with the autonomous vehicle 106. Generally, the plurality of failsafe homes associated with the autonomous vehicle 106 may change and/or be updated in real-time based at least in part on various conditions, such as a range of the autonomous vehicle 106, and/or user input. In particular, the navigation control system 101 is configured to add and/or to remove failsafe homes according to user input. As such, a user or an operator (e.g., at the navigation control system 101) can specify the failsafe homes from which an active failsafe home is established, for example.

In order to dynamically establish an active failsafe home for an autonomous vehicle 106 that accounts for constraint areas, the navigation control system 101 may be configured to store, retrieve, receive, access, and/or the like information associated with an environment and one or more constraint areas thereof (e.g., positioned within). For example, the autonomous vehicle 106 travels within an environment (e.g., a defined mission area), and the navigation control system 101 is configured to identify one or more constraint areas (e.g., No-Fly-Zones, physical barriers or objects, flight paths of other vehicles) in the environment. Specifically, the navigation control system 101 is configured to identify coordinates of a constraint area, borders of a constraint area, and/or the like. In this regard, the navigation control system 101 is also configured to access, store, and/or reference one or more digital maps with coordinate or reference systems, such that the navigation control system 101 can process relative locations and distances between waypoints and/or constraint areas.

Further, the navigation control system 101 is configured for performing one or more pathfinding techniques. For example, the navigation control system 101 comprises a pathfinding module, path planning circuitry, and/or the like configured for performing operations to optimize different paths between a set or a sequence of waypoints. For example, the navigation control system 101 is configured for performing operations in accordance with Dijkstra's algorithm, the A* algorithm, the sample algorithm, brute force methods, and/or the like.

The navigation control system 101 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with an example embodiment disclosed herein.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In some embodiments, the processor 202 may be configured to execute instructions stored in the memory 204 and/or circuitry otherwise accessible to the processor 202, such as interactions for various operations for configuring failsafe behavior through dynamically establishing an active failsafe home for an autonomous vehicle 106 to return to upon loss of communication. In some embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to a user and/or other entity and, in some embodiments, to receive an indication of an input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

FIGS. 3A-B illustrate example operations performed for dynamic establishment of an active failsafe home during navigation and travel of an autonomous vehicle 106 within an example environment 300. In the illustrated embodiment, the example environment 300 includes two constraint areas 302. As illustrated, the autonomous vehicle 106 is associated with three failsafe homes 304 (e.g., labelled in FIGS. 3A-B with H1, H2, and H3, respectively). In various embodiments, the navigation control system 101 has access to a data object (e.g., a file) storing coordinates for failsafe homes 304 associated with the autonomous vehicle 106. For example, the navigation control system 101 stores the data object and may update the data object to add and/or remove failsafe homes 304 as indicated by a user via user input (e.g., via input/output circuitry 206). As another example, the navigation control system 101 receives the data object from the autonomous vehicle 106.

In various example scenarios, the autonomous vehicle 106 is positioned within the environment 300 and may navigate and travel around within the environment 300. In various embodiments, the autonomous vehicle 106 is configured to traverse the environment 300 without intersecting, impacting, violating, and/or the like a constraint area 302. For example, the navigation control system 101 is configured to perform one or more pathfinding techniques in defining a route for the autonomous vehicle 106 to traverse and may communicate waypoints to the autonomous vehicle 106 in real-time, thus necessitating communication between the navigation control system 101 and the autonomous vehicle 106.

At different locations of the autonomous vehicle 106 (e.g., as the autonomous vehicle 106 traverses the environment), the failsafe homes 304 may be visible (e.g., a straight line between the autonomous vehicle 106 and each failsafe home, or a point associated with the failsafe home such as a point elevated above the failsafe home, does not intersect a constraint area 302) or invisible (e.g., the straight line intersects a constraint area 302). As such, in various example instances, one consistent or static active failsafe home cannot be established due to the traversal and movement of the autonomous vehicle 106 within the environment. That is, a statically-established active failsafe home may, at some points in time, be invisible to the autonomous vehicle 106, thereby resulting in intersection with a constraint area 302 as the autonomous vehicle 106 directly travels (e.g., in a straight line) to the statically-established active failsafe home in an instance in which a communication fault occurs at those same points in time.

Thus, it will be understood that an active failsafe home should be dynamically established as the autonomous vehicle 106 traverses the environment 300 (e.g., for different locations of the autonomous vehicle 106). In various embodiment, an initial active failsafe home may be determined and established for the autonomous vehicle 106 before the autonomous vehicle 106 begins travel. Referring first to the illustrated embodiment of FIG. 3A, a location of the autonomous vehicle 106 is shown relative to the two constraint areas 302 and the three failsafe homes 304. In some embodiments, the location of the autonomous vehicle 106 is a predicted location based at least in part on a configurable prediction window and the velocity of the autonomous vehicle 106. The location of the autonomous vehicle 106 for the purposes of dynamically establishing an active failsafe home may be predicted to account for performing various operations of dynamic establishment of an active failsafe home and causing transmission of an indication of the active failsafe home to the autonomous vehicle 106. Prediction (e.g., projection, forecasting) of the location of the autonomous vehicle 106 may be particularly advantageous in terms of improving accuracy in establishing an active failsafe home, as the autonomous vehicle 106 may be configured to continue travelling (e.g., maintaining velocity and orientation) and to wait for a configurable time-out period after a communication fault to elapse before directly traveling to an active failsafe home.

As shown in FIG. 3A, the failsafe home 304 labelled with "H1" and the failsafe home 304 labelled with "H2" are both invisible to the autonomous vehicle 106 and do not satisfy the pre-determined visibility condition (e.g., straight-line visibility). While FIG. 3A illustrates an approximately two-dimensional layout of the environment 300, the constraint areas 302, the failsafe homes 304, and the autonomous vehicle 106, it will be understood that various embodiments of the present disclosure are applicable to three-dimensional and/or higher-dimensional environments. For example, evaluation of whether a failsafe home 304 satisfies the pre-determined visibility condition may consider elevation of the autonomous vehicle 106, elevation of the failsafe home 304, and/or elevation of any constraint areas 302 that may be positioned between the autonomous vehicle 106 and the failsafe home 304. In any regard, the failsafe homes 304 labelled with "H1" and "H2" both do not satisfy the pre-determined visibility condition, which may be alternatively understood as the autonomous vehicle 106 being at (e.g., or predicted to be at) a location at which a constraint area 302 is intersected if travelling to the failsafe homes 304 labelled with "H1" and "H2".

Meanwhile, the failsafe home 304 labelled with "H3" satisfies the pre-determined visibility condition (e.g., straight-line visibility). Thus, in the illustrated embodiment, one failsafe home 304 is determined to be visible to the autonomous vehicle 106, while the remaining two failsafe homes 304 are determined to be invisible to the autonomous vehicle 106. As such, the failsafe home 304 determined to be visible (e.g., the failsafe home 304 labelled with "H3") can be established as the active failsafe home 306 (e.g., indicated by a dashed circle around the failsafe home 304). In establishing the failsafe home 304 labelled with "H3" as the active failsafe home 306 and communicating an indication of the active failsafe home 306 to the autonomous vehicle 106, the autonomous vehicle 106 is configured to and enabled to travel directly (e.g., in a straight line) and promptly to the failsafe home 304 labelled with "H3" if a communication fault is detected. As the "H3" failsafe home satisfies the pre-determined visibility condition, it can be presumed that no constraint areas 302 would be intersected if the autonomous vehicle 106 travels directly to the "H3" failsafe home.

In the illustrated embodiment of FIG. 3B, another location of the autonomous vehicle 106 is shown. In an example embodiment, the autonomous vehicle 106 travels from the location illustrated in FIG. 3A to the location illustrated in FIG. 3B, and as the autonomous vehicle 106 travels, the failsafe homes 304 are repeatedly (e.g., periodically, intermittently) evaluated with respect to the pre-determined visibility condition and the active failsafe home 306 may be updated. In some example embodiments, evaluation of failsafe homes 304 is performed at a frequency of approximately twice per second, or 2 Hz. In some embodiments, evaluation of failsafe homes 304 is performed at a frequency between about 1 Hz and 5 Hz. In some embodiments, evaluation of failsafe homes 304 is performed responsive to movement of the autonomous vehicle 106. For example, failsafe homes 304 are evaluated again to establish and/or update the active failsafe home 306 if the autonomous vehicle 106 travels more than a configurable distance away from a previous location, if the autonomous vehicle 106 surpasses a configurable speed threshold, if the autonomous vehicle 106 changes orientation by more than a configurable threshold of degrees, if the autonomous vehicle 106 is oriented towards a constraint area 302, and/or the like. Thus, it may be appreciated that establishment of an active failsafe home 306 based on evaluation of failsafe home 304 is performed dynamically over time.

FIG. 3B may then illustrate a location of the autonomous vehicle 106 at a moment in time at which establishment of the active failsafe home 306 is dynamically performed. The location of the autonomous vehicle 106 is positioned such that two failsafe homes 304 (the "H2" failsafe home and the "H3" failsafe home) satisfy the pre-determined visibility condition with respect to the constraint areas and are visible to the autonomous vehicle 106. In various embodiments, only one active failsafe home 306 can be established, and in instances in which multiple failsafe homes 304 satisfy the pre-determined visibility condition (e.g., straight-line visibility), an active failsafe home 306 is established according to respective priority values associated with the failsafe homes 304.

In the illustrated embodiment, the "H2" failsafe home has a higher respective priority value than the "H3" failsafe home, and as such, the "H2" failsafe home is established as the active failsafe home 306 (e.g., indicated by the dashed circle). In various embodiments, an active failsafe home 306 is established based at least in part on respective priority values and/or distances to each failsafe home 304 satisfying the pre-determined visibility condition from the location of the autonomous vehicle 106. For instance, the location is autonomous vehicle 106 is closer to the "H2" failsafe home than the "H3" failsafe home, and the "H2" failsafe home is established as the active failsafe home 306 for at least this reason. In various embodiments, an active failsafe home 306 is established based at least in part on a selection between multiple failsafe homes satisfying the pre-determined visibility condition according to respective priorities, respective distance, type of failure, and/or other various factors. In various embodiments, a previously-established active failsafe home 306 may be associated with a higher priority value, such that when multiple failsafe homes 304, including the previously-established active failsafe home 306, are satisfactory and visible, the previously-established active failsafe home 306 remains the active failsafe home 306.

FIGS. 4A-B illustrate another example environment 400 within which a constraint area 302 is positioned. In the illustrated embodiment, the autonomous vehicle 106 is associated with two failsafe homes 304. In FIG. 4A, the location of the autonomous vehicle 106 results in both failsafe homes 304 being invisible to the autonomous vehicle 106, or to not satisfy the pre-determined visibility condition (e.g., straight-line visibility). That is, in some areas of the environment 400, both failsafe homes 304 are invisible and inaccessible via direct (e.g., straight-line) travel without intersection of the constraint area 302. As previously discussed, "invisible" and "inaccessible" may be used to describe a failsafe home that cannot be reached by an autonomous vehicle 106 via a direct route or an approximately straight line, and a failsafe home may be invisible and inaccessible due to a constraint area 302 blocking such a direct route from the autonomous vehicle 106.

It may be appreciated that the existence of invisibility zones implies under-definition of failsafe homes 304, and in some embodiments, a notification is provided to a user requesting that the user define an additional failsafe home 304. In some embodiments, a failsafe home 304 may be automatically generated to account for invisible and inaccessible areas in the environment 400 (e.g., areas within which all available failsafe homes 304 are invisible and inaccessible).

More significantly, various embodiments involve causing (e.g., commanding) the autonomous vehicle 106 to promptly and/or immediately (e.g., within a configurable and pre-determined time window) return to the active failsafe home 306 (e.g., the last or most recently established active failsafe home 306). FIG. 4B illustrates one or more waypoints 410 being determined so that a route is provided for the autonomous vehicle 106 to navigate to the active failsafe home 306. In the illustrated embodiment, the "H1" failsafe home has been established as the active failsafe home 306. In various embodiments, the navigation control system 101 determines the one or more waypoints 410 using pathfinding techniques, optimization techniques, minimization techniques, machine learning techniques, and/or the like such that an efficient route from the location of the autonomous vehicle 106 to the active failsafe home 306 is mapped and further communicates the waypoints 410 to the autonomous vehicle 106. It may be appreciated that because the active failsafe home 306 is one of the failsafe homes 304 which are all directly invisible or direct inaccessible, waypoints must be efficiently and intelligently determined, as a direct route from the location of the autonomous vehicle 106 to the active failsafe home 306 would intersect a constraint area 302.

Thus, communication to provide the waypoints 410 and to command a prompt and/or immediate traversal to the active failsafe home 306 is transmitted to the autonomous vehicle 106. In this regard, the autonomous vehicle 106 being sent to the active failsafe home 306 preempts any situation in which the autonomous vehicle 106 loses communication connectivity with the navigation control station 101 (e.g., a ground control station, a leader autonomous vehicle) and becomes stranded in an area in which all failsafe homes (e.g., including the active failsafe home 306) are invisible and inaccessible. In various embodiments, areas in which all failsafe homes 304 are directly invisible and directly inaccessible are determined and supplement the constraint areas 302. For example, in the illustrated embodiment, the constraint area 302 may be expanded to include the invisible and inaccessible area within which the autonomous vehicle 106 is located, such that future navigation determinations that generally account for constraint areas 302 then also account for invisible and inaccessible areas for failsafe homes 304.

Referring now to FIGS. 5A-C, yet another example environment 500 is provided to demonstrate example determinations of whether failsafe homes 304 satisfy the pre-determined visibility condition (e.g., straight-line visibility). In various embodiments, a failsafe home 304 is associated with a visibility zone 502 upon being associated with the autonomous vehicle 106. In particular, a failsafe home 304 can be associated with a visibility zone 502 when constraint area information is known and well-defined (e.g., static, non-mobile), and a visibility zone 502 for a failsafe home 304 describes an area within which the failsafe home 304 is directly visible and accessible with respect to any constraint area 302. As previously described, the term "visible" and "accessible" can be used herein to describe reachability or accessibility by the autonomous vehicle, and a visible failsafe home is reachable or accessible by the autonomous vehicle 106 via a direct route or an approximately straight path. A failsafe home 304 being visible and accessible thereby indicates that a constraint area 302 is not blocking a direct route or an approximately straight line from the autonomous vehicle 106 to the failsafe home 304. Thus, the autonomous vehicle 106 may be located at any position within the visibility zone 502 with the corresponding failsafe home 304 being directly visible, accessible, and satisfying the pre-determined visibility condition.

In various embodiments, the pre-determined visibility condition includes straight-line visibility determined in real-time for a determined location of the autonomous vehicle 106, as described in the context of FIGS. 3A-B and 4A-B, and the pre-determined visibility condition may alternatively or additionally include visibility zone 502 positioning of the autonomous vehicle 106. That is, in some embodiments, a failsafe home 304 is determined to satisfy the pre-determined visibility condition based at least in part on the determining in real-time that the autonomous vehicle 106 is positioned within the visibility zone 502 of the failsafe home 304, the visibility zone 502 being determined at a prior point in time. As such, the pre-determined visibility condition of visibility zone 502 positioning may be advantageous, in example instances, due to pre-definition of the visibility zones 502. It will be recognized that pre-definition of the visibility zones 502 reduces the amount and complexity of processing and computing that must be performed in real-time, as the location of the autonomous vehicle 106 is compared against the visibility zones 502 of all the failsafe homes 304 without the need to generate and project straight-lines to each failsafe home 304 and to reference constraint area information in real-time.

FIG. 5A illustrates an example visibility zone 502 associated with the "H1" failsafe home. As illustrated, an autonomous vehicle 106 can be located at any position within the visibility zone 502 with the "H1" failsafe home being directly accessible without intersection with the constraint area 302 of the environment 500. Meanwhile, FIG. 5B illustrates another example visibility zone 502 associated with the "H2" failsafe home. Again, the visibility zone 502 illustrated in FIG. 5B and associated with the "H2" failsafe home includes locations from which the "H2" failsafe home would be visible and directly accessible. In various embodiments, if the constraint area 302 as illustrated is fixed, defined, and/or static and the environment 500 is well-defined and relatively finite, the visibility zone 502 for the "H2" failsafe home can be defined upon addition of the "H2" failsafe home (e.g., by user input). Thus, in some instances, visibility zones 502 can be defined as the failsafe homes 304 are being defined, reducing the amount and complexity of later processing and computation. It may be understood that use of visibility zones 502 is particular advantageous and efficient when the environment 500 is well-defined and relatively finite and when the constraint areas 302 are not relatively complex and have fixed positions.

In various embodiments, the user and/or operator defining a failsafe home 304 for the autonomous vehicle 106 is further enabled to define and/or modify a visibility zone 502 for the failsafe home 304. For instance, the navigation control system 101 may automatically generate and display a visibility zone 502 for a failsafe home 304, such as the visibility zone 502 illustrated in FIG. 5A, to the user, and the user may modify the visibility zone 502 to include additional areas and/or to cover less area. Following modification, the navigation control system 101 may be configured to re-evaluate the visibility zones 502 to ensure that the user did not include areas for a visibility zone 502 at which the failsafe home 304 is in fact not visible and directly accessible.

In some example embodiments, while the autonomous vehicle is positioned within a visibility zone, positioning data of the autonomous vehicle (e.g., determined using positioning circuitry such as GPS circuitry, determined using a cellular network) is shared with the navigation control system 101. However, the navigation control system 101 (e.g., a ground control station, a leader autonomous vehicle) may not establish a new or different active failsafe home while the autonomous vehicle is within the same visibility zone 502. That is, in some example embodiments, various operations to establish an active failsafe home from a plurality of failsafe homes are not performed or triggered until the autonomous vehicle leaves a current visibility zone and/or enters a different visibility zone. Accordingly, navigational operations of the autonomous vehicle 106 within one visibility zone does not cause performing of various operations and does not cause unnecessary communications, such that computing resources and communication traffic are both reduced.

In one or more example embodiments, the current positioning data may be monitored by the autonomous vehicle 106 itself, and the autonomous vehicle 106 is configured to be aware of the visibility zone 502 that the autonomous vehicle 106 is presently positioned within. If the current positioning data of the autonomous vehicle 106 remains within the same visibility zone 502, then the active failsafe home may be unchanged. The autonomous vehicle 106 may not share positioning data with the navigation control system 101 while the autonomous vehicle 106 determines that the autonomous vehicle 106 remains within the same visibility zone 502, in some example embodiments. The autonomous vehicle 106 may then share positioning data with the navigation control system 101 and may request a new active failsafe home whenever the autonomous vehicle 106 leaves the current visibility zone 502.

FIG. 5C illustrates example visibility zones 502 for multiple failsafe homes 304 together. In particular, both the example visibility zone 502 associated with the "H1" failsafe home (e.g., illustrated in FIG. 5A) and the example visibility zone 502 associated with the "H2" failsafe home (e.g., illustrated in FIG. 5B) are provided to indicate and determine a total area within which at least one failsafe home 304 is visible and directly accessible. In the illustrated embodiment, a zone overlap 504 is present, the zone overlap 504 including locations at which both the "H1" failsafe home and the "H2" failsafe home are visible and directly accessible (e.g., satisfy the pre-determined visibility condition). In various embodiments, the zone overlap 504 denotes locations at which a selection of a particular failsafe home must be made to establish one active failsafe home 306. As previously discussed, such a selection may be based at least in part on respective priority values associated with the failsafe homes 304, respective distances from the failsafe homes 304, capabilities (e.g., range) of the autonomous vehicle 106, and/or the like.

In some embodiments, a failsafe home 304 may be removed based at least in part on a size or magnitude of a zone overlap 504. For example, if a zone overlap 504 is a substantial portion (e.g., satisfying a configurable threshold) of the visibility zone 502 of a failsafe home, it may be understood that the visibility zone 502 of the failsafe home 304 is largely overlapping and possibly redundant in view of another visibility zone 502 for another failsafe home 304. As such, if a zone overlap 502 of two or more visibility zones 502 includes at least a threshold amount of area of a particular visibility zone 502, the failsafe home 304 associated with the particular visibility zone 502 may be removed due at least in part to redundancy with another overlapping failsafe home 304. In such instances, removal of a failsafe home 304 may necessitate and result in the respective priority values of the remaining failsafe homes 304 being updated or modified.

FIG. 5C further illustrates example invisibility zones 506. As previously described in the context of FIGS. 4A-B, invisibility zones 506 include areas within which none of the failsafe homes 304 associated with the autonomous vehicle 106 are visible or directly accessible (e.g., none satisfy the pre-determined visibility condition). As also previously discussed, in various embodiments, the autonomous vehicle 106 is caused to promptly and immediately return to the active failsafe home 306 when no failsafe home 304 is directly accessible. Thus, a determination to cause the autonomous vehicle 106 to return to the active failsafe home 306 based at least in part on no failsafe home 304 satisfying the pre-determined visibility condition (e.g., independent of a communication fault) can be made based at least in part on comparing the location of the autonomous vehicle 106 with one or more invisibility zones 506. Similar to the example operations described in the context of FIG. 4B, pathfinding waypoints may be determined to guide the autonomous vehicle 106 to the active failsafe home 306, due to the active failsafe home 306 being invisible or directly inaccessible. In some embodiments, the autonomous vehicle 106 being located within and/or near an invisibility zone 506 automatically triggers determination of pathfinding waypoints (e.g., using pathfinding techniques) to cause return of the autonomous vehicle 106 to the active failsafe home 306. The invisibility zones 506 can be pre-defined before travel of the autonomous vehicle 106 directly due to the pre-definition of the visibility zones 502 before travel of the autonomous vehicle 106. In various embodiments, the invisibility zones 506 are combined with a nearby constraint area 302, such as to expand the constraint area 302 to include invisibility zones 506.

In some example embodiments, various alert zones may also be determined and positioned at, near, surrounding, and/or the like borders of visibility zones 502 and invisibility zones 506. An alert zone may function to indicate that the autonomous vehicle may be located near the edge of a visibility zone 502 and may soon no longer be positioned within the visibility zone 502. In various embodiments, the autonomous vehicle 106 being positioned within an alert zone causes positioning data to be shared with the navigation control system 101 (e.g., a ground control system, a leader autonomous vehicle, a network server, a cloud server, or a multi-access edge computing (MEC) system for which computing is located near the edge of a network). As such, the need for constant data sharing between the autonomous vehicle 106 and the navigation control system 101 is reduced, as the current location of the autonomous vehicle is compared with the visibility zone 502, and the update may be sent or changed in the instance in which the location of the autonomous vehicle has changed to another zone. In various embodiments, the alert zones may be dynamically determined and sized according to a velocity of the autonomous vehicle 106, and a distance to the nearest border of a current visibility zone 502, for example.

With the above, FIGS. 3A-B, FIGS. 4A-B, and FIGS. 5A-C each describe example operations performed for configuring failsafe behavior through dynamic establishment of an active failsafe home for an autonomous vehicle 106. Failsafe homes 304 are evaluated in real-time according to a pre-determined visibility condition and with respect to a determined location of the autonomous vehicle 106 and nearby constraint areas 302. Accordingly, various embodiments provide technical advantages including extended functionality of autonomous vehicles 106 to travel without intersecting or violating constraint areas 302 in the event of a communication fault. The provided technical advantages further include conservation of resources and fewer user inputs, as various embodiments provide operations that are configured to be performed without local logic and decisions needing to be made locally by the autonomous vehicle 106.

Referring now to FIG. 6, a flowchart 600 is provided. The flowchart 600 illustrates example operations that are performed by the apparatus 200 (e.g., when embodied by the navigation control system 101), in some example embodiments. In particular, the flowchart 600 includes various operations performed by the apparatus 200 for dynamic establishment of an active failsafe home 306 for an autonomous vehicle 106 as the autonomous vehicle 106 traverses an environment (e.g., environment 300, environment 400, environment 500). In particular, various operations of the flowchart 600 are performed such that in the event of a communication fault, the autonomous vehicle 106 directly travels to an established active failsafe home without intersecting, impacting, violating, and/or the like a constraint area 302.

As shown, at operation 601, the apparatus 200 includes means, such as processor 202, memory 204, communications circuitry 208, and/or the like, for determining a location of the autonomous vehicle 106. In various embodiments, the autonomous vehicle 106 comprises positioning circuitry (e.g., GPS circuitry) and may provide location data including coordinates to the apparatus 200. That is, the apparatus 200 may receive a location from the autonomous vehicle 106. In various other embodiments, the apparatus 200 receives data, which may include transitionary data, from the autonomous vehicle 106, and uses the data to determine a location for the autonomous vehicle 106. For example, the apparatus 200 receives a velocity and orientation from the autonomous vehicle 106 and stores a previous location of the autonomous vehicle 106, and the apparatus 200 determines a location for the autonomous vehicle 106 using at least the velocity, orientation, and the previous location. In yet another example, the apparatus 200 may be configured to track the autonomous vehicle 106 (e.g., via satellite tracking, via satellite imagery, via another autonomous vehicle 106) and may determine a location of the autonomous vehicle 106 accordingly.

In various embodiments, the determined location of the autonomous vehicle 106 is a predicted location according to a configurable prediction time window. For example, the apparatus 200 determines a location that the autonomous vehicle 106 is predicted to be at subsequent to a prediction time window of five seconds. Determination and further use of a predicted location proves advantageous in improving accuracy, as delays arising from communication and various computing tasks and operations may result in a real-time location of the autonomous vehicle 106 being inaccurate and expired by the time an active failsafe home 306 is established. Further, in some embodiments, the autonomous vehicle 106 is configured to return directly to an active failsafe home 306 only upon elapsing of a time-out period after a communication fault occurs. Thus, the prediction time window may be based at least in part on the time-out period and is used to predict a location of the autonomous vehicle 106 whenever the autonomous vehicle 106 would begin direct travel to the active failsafe home 306.

At operation 602, the apparatus 200 includes means, such as processor 202, memory 204, input/output circuitry 206, and/or the like, for identifying a plurality of failsafe homes 304 associated with the autonomous vehicle 106. In various embodiments, the apparatus 200 stores a data object (e.g., a file, a record) describing failsafe homes for an autonomous vehicle 106 and may access the data object in memory 204, in a database, and/or the like. Additionally or alternatively, the apparatus 200 may receive via user input the plurality of failsafe homes. For example, the apparatus 200 displays a digital map of an environment via input/output circuitry 206, and a user indicates locations for each of the plurality of failsafe homes 304 also via input/output circuitry 206.

The plurality of failsafe homes 304 have respective priority values; that is, each failsafe home 304 may be associated with a respective priority value. The respective priority values are used to describe a preference for a failsafe home over another failsafe home as an active failsafe home 306. In various embodiments, when multiple failsafe homes 304 are eligible and satisfactory for being an active failsafe home, one failsafe home 304 is selected to be the active failsafe home 306 using the respective priority values. For example, the failsafe home 304 with the highest respective priority value is selected to be the active failsafe home.

In some embodiments, the plurality of failsafe homes 304 are also associated with visibility zones 502. Operation 602 may comprise defining a visibility zone 502 for each failsafe home 304 identified as being associated with the autonomous vehicle 106. FIGS. 5A-C illustrate example visibility zones 502 for failsafe homes 304. As previously discussed, a visibility zone 502 associated with a failsafe home 304 includes locations from which the failsafe home 304 is visible and directly accessible.

At decision node 603, the apparatus 200 includes means, such as processor 202, memory 204, and/or the like, for determining whether one or more failsafe homes satisfy the pre-determined visibility condition with respect to constraint areas 302. In various embodiments, the pre-determined visibility condition includes straight-line visibility, the straight-line being understood as two-dimensional in certain example instances and three-dimensional in other example instances.

In various embodiments, determining whether a particular failsafe home satisfies the pre-determined visibility condition comprises determining whether a straight line or a direct route from the determined location of the autonomous vehicle 106 to the particular failsafe home intersects, impacts, violates, and/or the like a constraint area 302. For example, FIGS. 3A-B and FIG. 4A illustrate determining whether the straight line or direct route intersects a constraint area 302. In an example embodiment, the example operations illustrated and discussed in the context of FIGS. 3A-B and FIG. 4A are performed in real-time with the determination of the location of the autonomous vehicle 106. That is, a straight line or direct route may be plotted upon determining the location of the autonomous vehicle 106 to a particular failsafe home 304 to determine whether the particular failsafe home 304 satisfies the pre-determined visibility condition.

In various embodiments, determining whether a particular failsafe home satisfies the pre-determined visibility condition comprises determining whether the location of the autonomous vehicle 106 is positioned within a visibility zone 502 associated with the particular failsafe home, and in various example instances, the visibility zone 502 is pre-defined at some time prior to determining the location of the autonomous vehicle 106. FIGS. 5A-C illustrate example visibility zones 502 for example failsafe homes 304. As discussed, the visibility zone 502 of the particular failsafe home defines an area within which the particular failsafe home is visible and directly accessible with respect to constraint areas 302. In some example instances, the location of the autonomous vehicle 106 is positioned within multiple visibility zones 502, or positioned within a zone overlap 504. Positioning of the location of the autonomous vehicle 106 within a zone overlap 504 indicates that multiple failsafe homes satisfy the pre-determined visibility condition.

If one or more failsafe homes satisfy the pre-determined visibility condition (e.g., determined by generating a direct route in real-time, determined by referencing visibility zones 502), the apparatus 200 may perform operation 604. At operation 604, the apparatus 200 establishes a failsafe home 304 of the one or more failsafe homes 304 satisfying the pre-determined visibility condition as the active failsafe home 306 and may do so based at least in part on the respective priority values associated with the one or more failsafe homes 304 satisfying the pre-determined visibility condition. The apparatus 200 includes means, such as processor 202, memory 204, and/or the like for establishing a failsafe home 304 as the active failsafe home 306 for the autonomous vehicle 106. In various embodiments, the apparatus 200 establishes a particular failsafe home 304 as the active failsafe home 306 based at least in part on the respective priority values as well as other factors that include respective distances of each failsafe home 304. For example, a failsafe home 304 that is closer to the location of the autonomous vehicle 106 is preferentially selected over another failsafe home 304 that is farther from the autonomous vehicle 106. In some embodiments, the respective priority values may be dynamically updated to account for respective distances of the failsafe homes 304.

Then, at operation 605, the apparatus 200 causes transmission of an indication of the active failsafe home 306 to the autonomous vehicle 106. As a result, the apparatus 200 of this example embodiment includes means, such as processor 202, memory 204, communications interface 208, and/or the like, for causing transmission of an indication of the active failsafe home 306 to the autonomous vehicle 106. In various embodiments, the autonomous vehicle 106 is aware of (e.g., stores coordinates for) an active failsafe home 306 at all times at least during navigation and travel such that in the event of a communication fault, the autonomous vehicle 106 can directly travel to the active failsafe home 306. Accordingly, the apparatus 200 causes transmission of the indication of the active failsafe home 306, which includes coordinates (e.g., latitudinal, longitudinal, elevational) of the active failsafe home 306. The coordinates of the active failsafe home 306 are based at least in part on the coordinates of the failsafe home 304 established as the active failsafe home 306. In some embodiments, the indication of the active failsafe home 306 further includes an indication of a time period during which a failsafe home will serve as the active failsafe home 306. For example, an active failsafe home 306 is established dynamically at a frequency of twice per second, and the indication therefore may indicate that the active failsafe home 306 is valid or accurate for half a second. As such, the autonomous vehicle 106 may be aware that the active failsafe home 306 is subject to being updated or changed due to the dynamic establishment of the active failsafe home 306.

Returning to decision node 603, if no failsafe homes are determined to satisfy the pre-determined visibility condition, the apparatus 200 proceeds to perform operation 606. At operation 606, the apparatus 200 determines one or more waypoints for a route from the location of the autonomous vehicle 106 to the last-established active failsafe home 306. The apparatus 200 includes means, such as processor 202, memory 204, and/or the like, for determining waypoints for a route from between locations. As discussed, the active failsafe home 306 of one example embodiment is established at an approximate rate of twice per second, and thus, the route connects to the active failsafe home 306 established at least half a second prior. FIG. 4B illustrates example waypoints that are determined if no failsafe homes 304 are determined to satisfy the pre-determined visibility condition. As discussed, the waypoints may be determined using one or more pathfinding techniques, one or more optimization techniques, one or more machine learning techniques, and/or the like to construct an efficient route.

Then, at operation 607, the apparatus 200 includes means, such as processor 202, memory 204, communications interface 208, and/or the like, for causing transmission of the waypoints to the autonomous vehicle 106 and for causing the autonomous vehicle 106 to promptly travel according to the waypoints. In various embodiments, the autonomous vehicle 106 begins to travel according to the waypoints after a configurable delay time period. For example, the configurable delay time period may be similar to and/or based at least in part on the time-out period to allow for the communication fault to potentially resolve. In some instances, the communication fault may resolve, and the autonomous vehicle 106 returns its original location and may continue to perform various tasks and navigation. In such instances, the autonomous vehicle 106 may return to the original location via the same waypoints, or additional waypoints are determined to guide the autonomous vehicle 106 to the original location.

As described above, operations, methods, apparatuses, and computer program products are disclosed for configuring failsafe behavior through dynamic establishment of an active failsafe home for an autonomous vehicle 106. Various embodiments provide technical advantages including extended functionality of autonomous vehicles 106 to travel without intersecting or violating constraint areas 302 in the event of a communication fault. The provided technical advantages further include conservation of resources and fewer user inputs, as various embodiments provide operations that are configured to be performed without local logic and decisions needing to be made locally by the autonomous vehicle 106.

In some examples, the fault experienced by the autonomous vehicle 106 may resolve quickly or at least before the autonomous vehicle 106 has completed travel to the active failsafe home. For example, communication with the navigation control station 101 returns to the autonomous vehicle to thereby resolve a communication fault. In instances in which the fault resolves early, the navigation control station 101 may provide new guidance to the autonomous vehicle 106 to return to a planned path, for example. In such instances, the failsafe homes may be updated accordingly upon the return of the autonomous vehicle 106 to the planned path with respect to each visibility zone.

FIG. 6 illustrates a flowchart depicting operations according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the present disclosure set forth herein will come to mind to one skilled in the art to which present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to:
   determine a location of an autonomous vehicle;
   identify a plurality of failsafe homes associated with the autonomous vehicle, wherein respective ones of the plurality of failsafe homes comprise locations to which the autonomous vehicle is configured to return upon the determination that a fault has occurred with the autonomous vehicle;
   identify one or more constraint areas with respect to the location, wherein the one or more constraint areas comprise areas through which the autonomous vehicle is unable to traverse;
   determine whether a particular failsafe home of the plurality of failsafe homes associated with the autonomous vehicle satisfies a pre-determined condition with respect to the location of the autonomous vehicle and the one or more constraint areas, wherein the pre-determined condition is based at least in part on the location of the autonomous vehicle being within a visibility zone, the visibility zone representing an area within which the particular failsafe home is accessible by the autonomous vehicle via a direct route without intersecting with the one or more constraint areas;
   in accordance with a determination that the particular failsafe home satisfies the pre-determined condition, establish the particular failsafe home as an active failsafe home for the autonomous vehicle and cause transmission of the active failsafe home to the autonomous vehicle, wherein the active failsafe home comprises a selected failsafe home to which the autonomous vehicle will navigate directly upon determining that a communication fault has occurred; and
   configure the particular failsafe home to remain as the active failsafe home until the autonomous vehicle leaves the visibility zone associated with the particular failsafe home to another visibility zone such that the particular failsafe home no longer satisfies the pre-determined condition with respect to the determined location of the autonomous vehicle.

2. The apparatus of claim 1, wherein the particular failsafe home is established as the active failsafe home based at least in part on a respective priority value associated with the particular failsafe home in an instance in which more than one failsafe homes is determined to satisfy the pre-determined condition.

3. The apparatus of claim 1, wherein the at least one memory and the computer program code are further configured to, with the at least one processor, cause the apparatus to:
   determine a second location of the autonomous vehicle;
   in accordance with a determination that none of the plurality of failsafe homes satisfy the pre-determined condition with respect to the second location of the autonomous vehicle and the one or more constraint areas, determine one or more waypoints for a route from the second location of the autonomous vehicle to the active failsafe home, the route satisfying the one or more constraint areas; and
   cause transmission of the one or more waypoints to the autonomous vehicle.

4. The apparatus of claim 3, wherein the plurality of waypoints are determined using one or more pathfinding techniques configured to modify distances between the plurality of waypoints while satisfying the one or more constraint areas.

5. The apparatus of claim 1, wherein the location is a predicted location of the autonomous vehicle based at least in part on a real-time location of the autonomous vehicle, a velocity of the autonomous vehicle, and a configurable prediction time window.

6. The apparatus of claim 1, wherein the at least one memory and the computer program code are further configured to, with the at least one processor, cause the apparatus to determine whether the plurality of failsafe homes satisfy a straight path visibility condition and update the active failsafe home at a pre-determined frequency.

7. A method comprising:
   determining a location of an autonomous vehicle;
   identifying a plurality of failsafe homes associated with the autonomous vehicle, wherein respective ones of the plurality of failsafe homes comprise locations to which the autonomous vehicle is configured to return upon the determination that a fault has occurred with the autonomous vehicle;
   identifying one or more constraint areas with respect to the location, wherein the one or more constraint areas comprise areas through which the autonomous vehicle is unable to traverse;
   determining whether a particular failsafe home of the plurality of failsafe homes associated with the autonomous vehicle satisfies a pre-determined condition with respect to the location of the autonomous vehicle and the one or more constraint areas, wherein the pre-determined condition is based at least in part on the location of the autonomous vehicle being within a visibility zone, the visibility zone representing an area within which the particular failsafe home is accessible by the autonomous vehicle via a direct route without intersecting with the one or more constraint areas;

in accordance with a determination that the particular failsafe home satisfies the pre-determined condition, establishing the particular failsafe home as an active failsafe home for the autonomous vehicle and causing transmission of the active failsafe home to the autonomous vehicle, wherein the active failsafe home comprises a selected failsafe home to which the autonomous vehicle will navigate directly upon determining that a communication fault has occurred; and configuring the particular failsafe home to remain as the active failsafe home until the autonomous vehicle leaves the visibility zone associated with the particular failsafe home to another visibility zone such that the particular failsafe home no longer satisfies the pre-determined condition with respect to the determined location of the autonomous vehicle.

8. The method of claim 7, wherein the particular failsafe home is established as the active failsafe home based at least in part on a respective priority value associated with the particular failsafe home in an instance in which more than one failsafe home is determined to satisfy the pre-determined condition.

9. The method of claim 7, further comprising:
receiving a second location of the autonomous vehicle;
in accordance with a determination that none of the plurality of failsafe homes satisfy the pre-determined condition with respect to the second location of the autonomous vehicle and the one or more constraint areas, determining one or more waypoints for a route from the second location of the autonomous vehicle to the active failsafe home, the route satisfying the one or more constraint areas; and
causing transmission of the one or more waypoints to the autonomous vehicle.

10. The method of claim 9, wherein the plurality of waypoints are determined using one or more pathfinding techniques configured to optimize distances between the plurality of waypoints while satisfying the one or more constraint areas.

11. The method of claim 7, wherein the location is a predicted location of the autonomous vehicle based at least in part on a real-time location of the autonomous vehicle, a velocity of the autonomous vehicle, and a configurable prediction time window.

12. The method of claim 7, further comprising determining whether the plurality of failsafe homes satisfy a straight path visibility condition and updating the active failsafe home at a pre-determined frequency.

13. The method of claim 7, wherein the pre-determined condition is a straight-line visibility condition.

14. A computer program product comprising a non-transitory computer readable storage medium having program code portions stored thereon, the program code portions configured, when executed by a processor, to:

determine a location of an autonomous vehicle;
identify a plurality of failsafe homes associated with the autonomous vehicle, wherein respective ones of the plurality of failsafe homes comprise locations to which the autonomous vehicle is configured to return upon the determination that a fault has occurred with the autonomous vehicle;
identify one or more constraint areas with respect to the location, wherein the one or more constraint areas comprise areas through which the autonomous vehicle is unable to traverse;
determine whether a particular failsafe home of the plurality of failsafe homes associated with the autonomous vehicle satisfies a pre-determined condition with respect to the location of the autonomous vehicle and the one or more constraint areas, wherein the pre-determined condition is based at least in part on the location of the autonomous vehicle being within a visibility zone, the visibility zone representing an area within which the particular failsafe home is accessible by the autonomous vehicle via a direct route without intersecting with the one or more constraint areas;
in accordance with a determination that the particular failsafe home satisfies the pre-determined condition, establish the particular failsafe home as an active failsafe home for the autonomous vehicle and cause transmission of the active failsafe home to the autonomous vehicle, wherein the active failsafe home comprises a selected failsafe home to which the autonomous vehicle will navigate directly upon determining that a communication fault has occurred; and
configure the particular failsafe home to remain as the active failsafe home until the autonomous vehicle leaves the visibility zone associated with the particular failsafe home to another visibility zone such that the particular failsafe home no longer satisfies the pre-determined condition with respect to the determined location of the autonomous vehicle.

15. The computer program product of claim 14, wherein the particular failsafe home is established as the active failsafe home based at least in part on a respective priority value associated with the particular failsafe home in an instance in which one or more different failsafe homes are determined to satisfy the pre-determined condition.

16. The computer program product of claim 14, wherein the program code portions are further configured, upon execution, to:
determine a second location of the autonomous vehicle;
in accordance with a determination that none of the plurality of failsafe homes satisfy the pre-determined condition with respect to the second location of the autonomous vehicle and the one or more constraint areas, determine one or more waypoints for a route from the second location of the autonomous vehicle to the active failsafe home, the route satisfying the one or more constraint areas; and
cause transmission of the one or more waypoints to the autonomous vehicle.

* * * * *